(12) United States Patent
Kimura et al.

(10) Patent No.: US 10,491,903 B2
(45) Date of Patent: Nov. 26, 2019

(54) DELIVERY RATE SELECTION DEVICE, DELIVERY RATE SELECTION METHOD, AND PROGRAM

(71) Applicant: NIPPON TELEGRAPH AND TELEPHONE CORPORATION, Chiyoda-ku (JP)

(72) Inventors: Takuto Kimura, Musashino (JP); Masahiro Yokota, Musashino (JP); Ken Nishimatsu, Musashino (JP); Hiroshi Yamamoto, Musashino (JP); Kei Takeshita, Musashino (JP); Kazumichi Sato, Musashino (JP); Taichi Kawano, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 92 days.

(21) Appl. No.: 15/747,008

(22) PCT Filed: Jun. 9, 2016

(86) PCT No.: PCT/JP2016/067241
§ 371 (c)(1),
(2) Date: Jan. 23, 2018

(87) PCT Pub. No.: WO2017/018072
PCT Pub. Date: Feb. 2, 2017

(65) Prior Publication Data
US 2018/0213234 A1    Jul. 26, 2018

(30) Foreign Application Priority Data
Jul. 28, 2015    (JP) ................................. 2015-148829

(51) Int. Cl.
*H04N 19/146*    (2014.01)
*H04N 21/258*    (2011.01)
(Continued)

(52) U.S. Cl.
CPC ......... *H04N 19/146* (2014.11); *H04N 19/115* (2014.11); *H04N 19/164* (2014.11);
(Continued)

(58) Field of Classification Search
CPC .. H04N 19/146; H04N 19/115; H04N 19/164; H04N 21/44222; H04N 21/25866;
(Continued)

(56) References Cited

U.S. PATENT DOCUMENTS

2015/0172680 A1*    6/2015  Zhou ...................... H04N 19/14
                                                           375/240.06
2016/0173915 A1*    6/2016  McCarthy ........ H04N 21/23418
                                                           725/95

OTHER PUBLICATIONS

International Search Report dated Sep. 13, 2016, in PCT/JP2016/067241 filed Jun. 9, 2016.
(Continued)

*Primary Examiner* — Jared Walker
(74) *Attorney, Agent, or Firm* — Oblon, McClelland, Maier & Neustadt, L.L.P.

(57) ABSTRACT

A delivery rate selection device, for selecting a delivery rate when delivering a video image from a video delivery server to a client in a video delivery service. When a delivery rate calculating unit receives from an inquiry source an inquiry of delivery rate for delivering a video image to a given user, a delivery rate calculating unit acquires presence or absence of a playback stall tolerance and presence or absence of an image quality deterioration tolerance of the given user from the user characteristic storage unit, selects an encoding rate from a plurality of encoding rates of the video image according to a combination of the presence or absence of a (Continued)

playback stall tolerance and the presence or absence of an image quality deterioration tolerance of the given user, and returns the selected encoding rate as the delivery rate to the inquiry source.

8 Claims, 8 Drawing Sheets

(51) Int. Cl.
    *H04N 21/2662* (2011.01)
    *H04N 21/24* (2011.01)
    *H04N 19/115* (2014.01)
    *H04N 19/164* (2014.01)
    *H04N 21/654* (2011.01)
    *H04N 21/2343* (2011.01)
    *H04N 21/442* (2011.01)

(52) U.S. Cl.
    CPC ... *H04N 21/23439* (2013.01); *H04N 21/2402* (2013.01); *H04N 21/2407* (2013.01); *H04N 21/258* (2013.01); *H04N 21/25866* (2013.01); *H04N 21/2662* (2013.01); *H04N 21/44222* (2013.01); *H04N 21/654* (2013.01)

(58) Field of Classification Search
    CPC ........... H04N 21/2407; H04N 21/2402; H04N 21/23439; H04N 21/258; H04N 21/2662; H04N 21/654
    USPC .................................................. 375/240.02
    See application file for complete search history.

(56) References Cited

OTHER PUBLICATIONS

Yamamoto, Hiroshi et al., "Viewing Quality Optimization Technology (Quality API)", NTT Gijutsu Journal, vol. 27, No. 4, (2015), 11 pages, with an English Translation.

Kimura, Takuto et al., "An Analysis of Bandwidth Allocation Algorithm Based on QoE Model for Video Services", The Institute of Electronics, Information and Communication Engineers, IEICE Technical Report, vol. 115, No. 11, (2015), pp. 21 to 26, with an English Abstract.

Yamamoto, Hiroshi, "[Special Talk] Toward QoE-Centric Operation of Telecommunication Services", The Institute of Electronics, Information and Communication Engineers, IEICE Technical Report, vol. 114, No. 299, (2014), pp. 49-52, with an English Abstract.

Kawano, Taichi et al., "Video Stall Count Estimation Model of Progressive Download-Based Video Services", Proceedings of the 2014 IEICE Society Conference, B-11-27, (2014), p. 258. with an English Translation.

\* cited by examiner

FIG.5

| USER ID | VIEWING DATE AND TIME | VIDEO LENGTH [s] | VIEWED TIME LENGTH [s] | BIT RATE [kbps] | STALL COUNT |
|---|---|---|---|---|---|
| ae126 | 2015.02.02 12:34:23 | 60 | 60 | 126 | 0 |
| fe123 | 2015.02.02 12:34:35 | 150 | 123 | 512 | 2 |
| ae126 | 2015.02.02 12:36:01 | 30 | 34 | 200 | 1 |

FIG.6

| USER ID | PLAYBACK STALL TOLERANCE | IMAGE QUALITY DETERIORATION TOLERANCE | HIGH QUALITY STANDARD [kbps] |
|---|---|---|---|
| r89m01 | T | T | 200 |
| s13y41 | F | T | 765 |
| ko4pa6 | T | F | 346 |

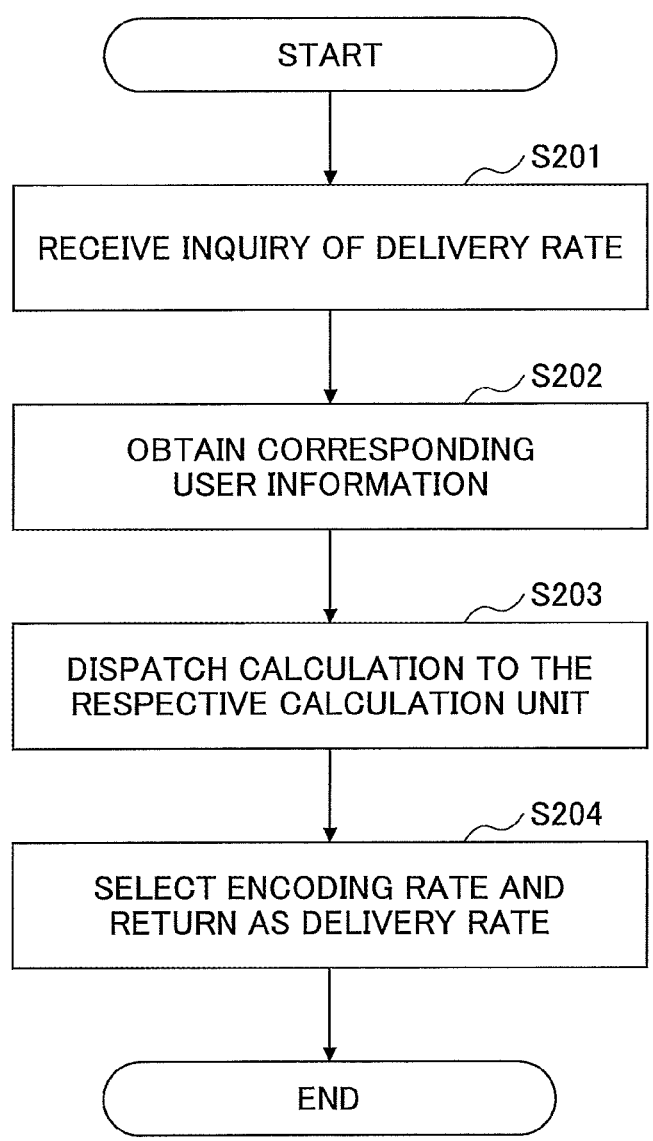

DELIVERY RATE SELECTION DEVICE, DELIVERY RATE SELECTION METHOD, AND PROGRAM

TECHNICAL FIELD

This invention relates to the technique for selecting a delivery rate in the video streaming service by using the characteristics of the sensitivity to quality degradation being different for each user.

BACKGROUND ART

In recent years, video streaming service (video delivery service) via networks is becoming widespread. In the video streaming service, especially, a contents delivery method called progressive download type (hereinafter referred to as "PDL type") is widely used. In the PDL type video contents delivery method, a server divides a video content into small pieces called chunks, and delivers the chunks. A client downloads the chunks and playbacks the contents of the chunks. In most cases, since the server stores multiple types of encoded data each of which is obtained by encoding an original video data at different encoding rates, the client can select the encoding rate of the chunk to be retrieved at beginning of playback or during playback.

In selecting the encoding rate, if a higher encoding rate is selected, higher resolution of video image can be retrieved. However, since an amount of data in each chunk becomes bigger if a higher encoding rate is selected, a playback stall is likely to occur. On the other hand, if a lower encoding rate is selected, a quality of video image is degraded. But since an amount of data in each chunk becomes less if a lower encoding rate is selected, a playback stall is less likely to occur. That is, since there is a tradeoff between the encoding rate and the playback stall, it is required to establish an encoding rate selecting method to keep balance between the encoding rate and the playback stall. But the optimal encoding rate selecting method is not definite.

Note that the encoding rate refers to the number of bits used for an encoded video image per second. The encoding rate can be regarded as the same as a rate for delivering encoded data (delivery rate). Also, the encoding rate and the delivery rate may be called "bit rate".

To solve the problem, a method of selecting the encoding rate based on quality of experience (QoE) is proposed (see Non-Patent Document 1 for example). In the proposed method, a network provider utilizes a model for estimating quality of application and QoE based on past network quality information, to determine the delivery rate so that QoE becomes highest. The network provider makes a recommendation of the determined delivery rate to a service provider.

PRIOR-ART DOCUMENTS

Non-Patent Documents

[Non-Patent Document 1] Hiroshi Yamamoto, "Special Talk: Toward QoE-centric Operation of Telecommunication Services", IEICE technical report, vol. 114, no. 299, pp. 49-52, November 2014,
[Non-Patent Document 2] Taichi Kawano, Kei Takeshita, and Hiroshi Yamamoto, "Video stall count estimation model of progressive download-based video services", Proceedings of the 2014 IEICE Society Conference, B-11-27, September 2014.

SUMMARY OF INVENTION

Problems to be Solved by the Invention

In the model for estimating QoE used in the prior art, a value representing how an average user feels is estimated, and the characteristics for each user is not considered.

For example, consider a case where user A who is sensitive to a playback stall and user B who is sensitive to degradation of video images exist. In a case where the delivery rate is determined based on the prior art, if user A and user B are using networks of the same quality, the same encoding rate is selected for both user A and user B. However, considering the characteristics of each user, it is desirable that a smaller encoding rate is selected for user A to avoid playback stall and that a larger encoding rate is selected for user B to deliver higher resolution of video images. That is, there is a problem that the conventional technique cannot provide the optimal encoding rate selecting method for each user.

This invention is designed to solve the problem, which enables the selection of an encoding rate in the video streaming service in accordance with the characteristics of each user.

Means for Solving the Problem

According to an aspect of the embodiments, a delivery rate selection device for selecting a delivery rate when delivering a video image from a video delivery server to a client in a video delivery service including a user characteristic storage unit to store user characteristics including a presence or absence of a playback stall tolerance for each user and a presence or absence of an image quality deterioration tolerance for each user, and a delivery rate calculating unit is provided. When the delivery rate calculating unit receives from an inquiry source an inquiry of the delivery rate for delivering a video image to a given user, the delivery rate calculating unit acquires the presence or absence of a playback stall tolerance and the presence or absence of an image quality deterioration tolerance of the given user from the user characteristic storage unit, selects an encoding rate from a plurality of encoding rates of the video image according to a combination of the presence or absence of a playback stall tolerance and the presence or absence of an image quality deterioration tolerance of the given user, and returns the selected encoding rate as the delivery rate to the inquiry source.

Further according to an aspect of the embodiments, a delivery rate selection method performed in a delivery rate selection device for selecting a delivery rate when delivering a video image from a video delivery server to a client in a video delivery service is provided. The delivery rate selection device includes a user characteristic storage unit to store user characteristics including a presence or absence of a playback stall tolerance for each user and a presence or absence of an image quality deterioration tolerance for each user. The delivery rate selection method includes a step of receiving from an inquiry source an inquiry of the delivery rate for delivering the video image to a given user, a step of acquiring the presence or absence of a playback stall tolerance and the presence or absence of an image quality deterioration tolerance of the given user from the user characteristic storage unit, a step of selecting an encoding rate from a plurality of encoding rates of the video image according to a combination of the presence or absence of a playback stall tolerance and the presence or absence of an image quality deterioration tolerance of the given user, and a step of returning the selected encoding rate as the delivery rate to the inquiry source.

Advantage of the Invention

According to the embodiment of the present invention, the technique can be provided that enables the selection of an encoding rate in the video streaming service in accordance with the characteristics of each user.

BRIEF DESCRIPTION OF DRAWINGS

FIG. 5 illustrates an example of data stored in a view history database;

FIG. 6 illustrates an example of data stored in a user characteristic database;

FIG. 9 is a flowchart illustrating a process of calculating delivery rate.

DETAILED DESCRIPTION OF THE PREFERRED EMBODIMENTS

An embodiment of the present invention will be described below with reference to the drawings. Note that the embodiment that will be described below is just an example, and embodiments to which the present invention is applied are not limited to the following embodiment.

<Overall Configuration of Delivery Rate Selection Device>

Figure 1:
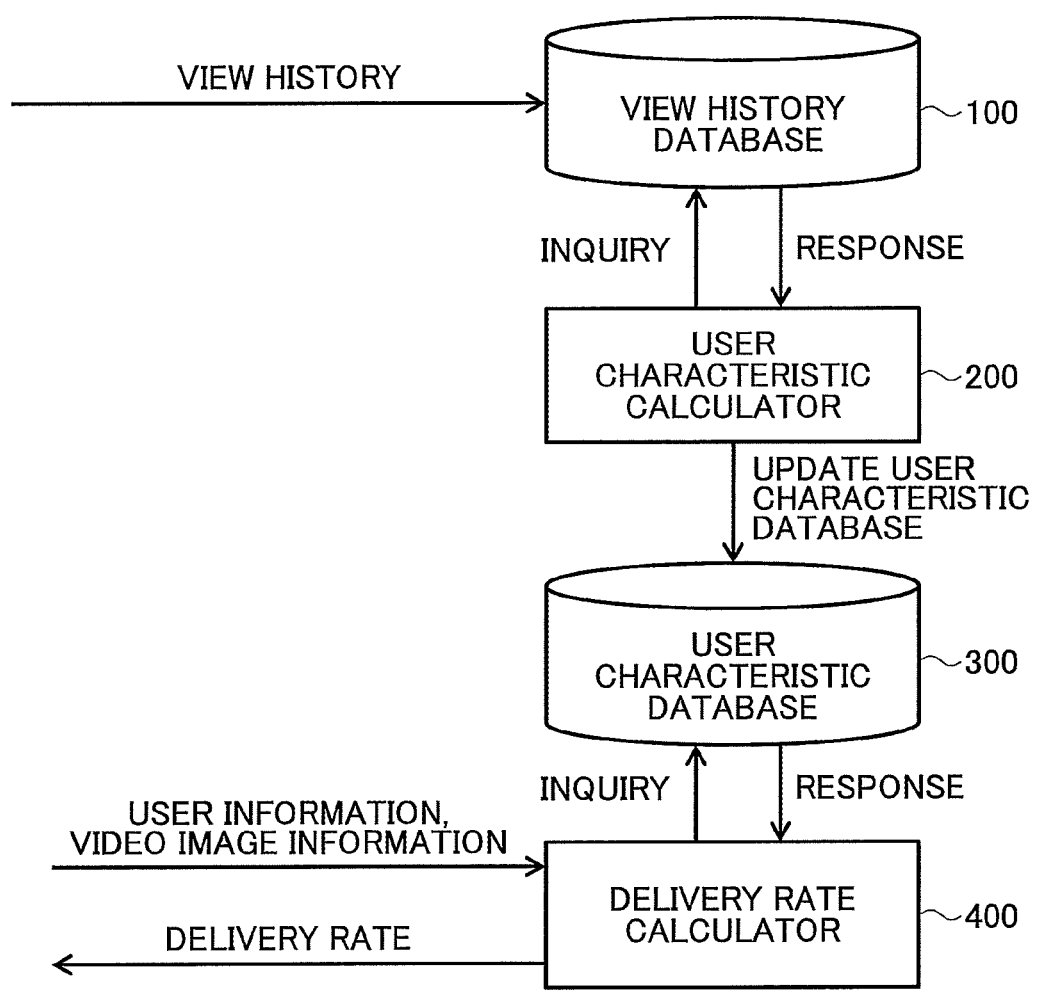
FIG. 1 is a drawing illustrating an example of an overall configuration of a delivery rate selection device according to an embodiment of the present invention.

FIG. 1 illustrates an example of an overall configuration of a delivery rate selection device for selecting a delivery rate when delivering a video image from a video delivery server to a client in a PDL type video delivery service. As illustrated in FIG. 1, the delivery rate selection device includes a view history database 100, a user characteristic calculator 200, a user characteristic database 300, and a delivery rate calculator 400. A summary of each component will be described below.

The view history database 100 stores a view history of each user. FIG. 5 illustrates an example of data stored in the view history database 100. As illustrated in FIG. 5, a viewing date and time, a video length, a viewed time length, a bit rate, and a stall count are recorded for each user id. Note that the data illustrated in FIG. 5 is just an example. Any types of data may be stored in the view history database 100 with any format if the data is necessary for calculating a user characteristic or a delivery rate. Note that the "database" according to the present embodiment may be referred to as a "storage unit".

A method of obtaining the view history to be stored in the view history database 100 is not limited to a specific method. For example, by capturing a packet on a network between each user terminal for viewing a video image and a video delivery server, and by analyzing the packet, a view history may be assumed (whether it is in a playback state, or it is in a stall state and the like). Alternatively, the view history may be acquired from each user terminal directly.

In FIG. 5, each record is a view history representing that a certain user has viewed a video image delivered at a certain bit rate. "Viewing date and time" represents a start time of the viewing. "Video length" represents a time length of the video image that the user viewed, which is, for example, a sum of a period of playback of all chunks constituting a video image data corresponding to the record. "Viewed time length" represents a length of time that the user viewed the video image (including the period while a playback stall occurred). "Bit rate" represents an encoding rate. "Stall count" represents the number of times when a playback stall occurred.

The view history database 100 illustrated in FIG. 1 is configured to respond to an inquiry from the user characteristic calculator 200. The user characteristic calculator 200 calculates a user characteristic based on the data acquired from the view history database 100, and stores the calculated result into the user characteristic database 300.

An example of data stored in the user characteristic database 300 is illustrated in FIG. 6. As illustrated in FIG. 6, the user characteristic database 300 stores a playback stall tolerance, an image quality deterioration tolerance, and a high quality standard for each user id. Each of the playback stall tolerance and the image quality deterioration tolerance has either a present state or an absent state. In FIG. 6, "T" in the column of the playback stall tolerance (or the image quality deterioration tolerance) represents that the playback stall tolerance (or the image quality deterioration tolerance) is present (which means that the user has tolerance for a playback stall (or tolerance for an image quality deterioration)), and "F" in the column of the playback stall tolerance (or the image quality deterioration tolerance) represents that the playback stall tolerance (or the image quality deterioration tolerance) is absent (which means that the user does not have tolerance for a playback stall (or tolerance for an image quality deterioration)). The high quality standard is information represented as an integer. Details of the user characteristic will be described later.

The delivery rate calculator 400 illustrated in FIG. 1 is a component that, in response to receiving an inquiry of a delivery rate (including user information and video image information), obtains the user characteristic from the user characteristic database 300, selects an encoding rate based on the user characteristic, and returns the encoding rate to an inquiry source as the delivery rate.

The user characteristic calculator 200 and the delivery rate calculator 400 in the delivery rate selection device according to the present embodiment can be embodied, for example, by one or more computers executing a program as described regarding the contents of the process, which will be explained in the present embodiment. That is, functions of these functional components (such as the user characteristic calculator 200 and the delivery rate calculator 400) can be embodied by a computer executing the program corresponding to the process executed by these functional components using hardware resources such as a CPU and memory included in the computer. The above program can be recorded in a computer-readable storage media (such as removable memory) for saving or distribution. Also, the above program can be provided through a network, such as the Internet or e-mail.

Figure 2:
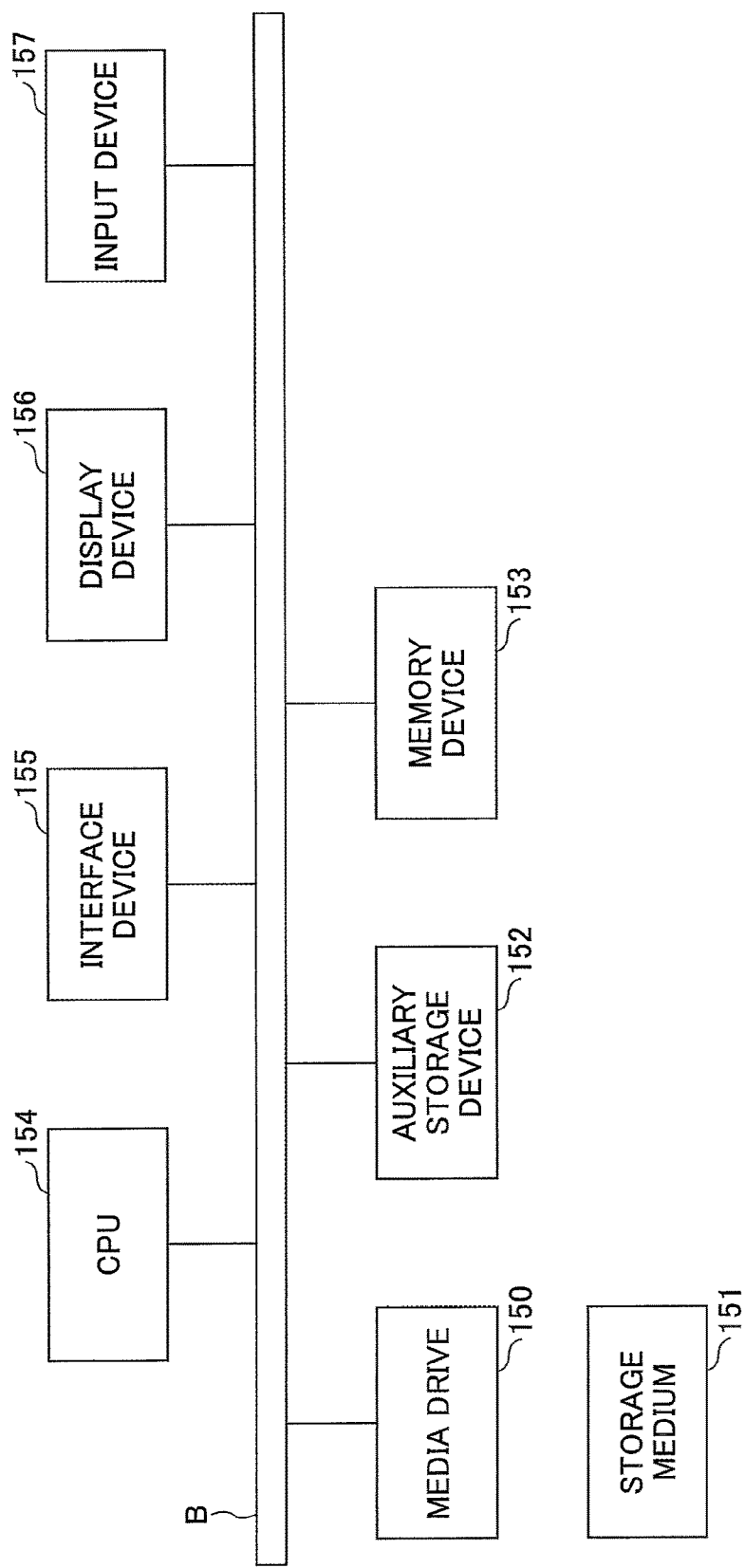
FIG. 2 is a drawing illustrating a hardware configuration of a delivery rate selection device according to the embodiment of the present invention.

FIG. 2 is a drawing illustrating a hardware configuration of a delivery rate selection device when the delivery rate selection device is embodied by a computer. The delivery rate selection device illustrated in FIG. 2 includes a media drive 150, an auxiliary storage device 152, a memory device 153, a CPU 154, an interface device 155, a display device 156, an input device 157 and the like, each of which is interconnected via a bus B.

The program for embodying the processes in the delivery rate selection device is provided by a storage medium 151 such as a CD-ROM, a memory card, or the like. When the storage medium 151 storing the program is inserted in the media drive 150, the program is installed from the storage medium 151 into the auxiliary storage device 152 via the media drive 150. However, the program may not necessarily be installed from the storage medium 151. The program may be downloaded from other computers via a network. The auxiliary storage device 152 stores the installed program as well as other necessary files or data.

When a request to start the program is received, the program is read out from the auxiliary storage device 152 and is stored into the memory device 153. The CPU 154 embodies functions concerning the delivery rate selection device in accordance with the program in the memory device 153. The interface device 155 includes an interface for connecting the delivery rate selection device to the network. The display device 156 is for displaying a GUI (Graphical User Interface) embodied by the program. The input device 157 is used for entering various instructions from users, which includes, for example, a keyboard, a mouse, a button, or a touch panel.

Note that FIG. 2 is also a drawing illustrating a hardware configuration of the user characteristic calculator 200 when the user characteristic calculator 200 is configured through a computer. Also FIG. 2 is a drawing illustrating a hardware configuration of the delivery rate calculator 400 when the delivery rate calculator 400 is configured through a computer.

Further, at least one of the view history database 100 and the user characteristic database 300 may be placed outside the delivery rate selection device. However, it should be noted that in this case also, a set of the delivery rate selection device, the view history database 100 and the user characteristic database 300 may be referred to as a "delivery rate selection device".

Next, the configuration of the user characteristic calculator 200 and the delivery rate calculator 400 will be described.

<Configuration of User Characteristic Calculator 200>

Figure 3:
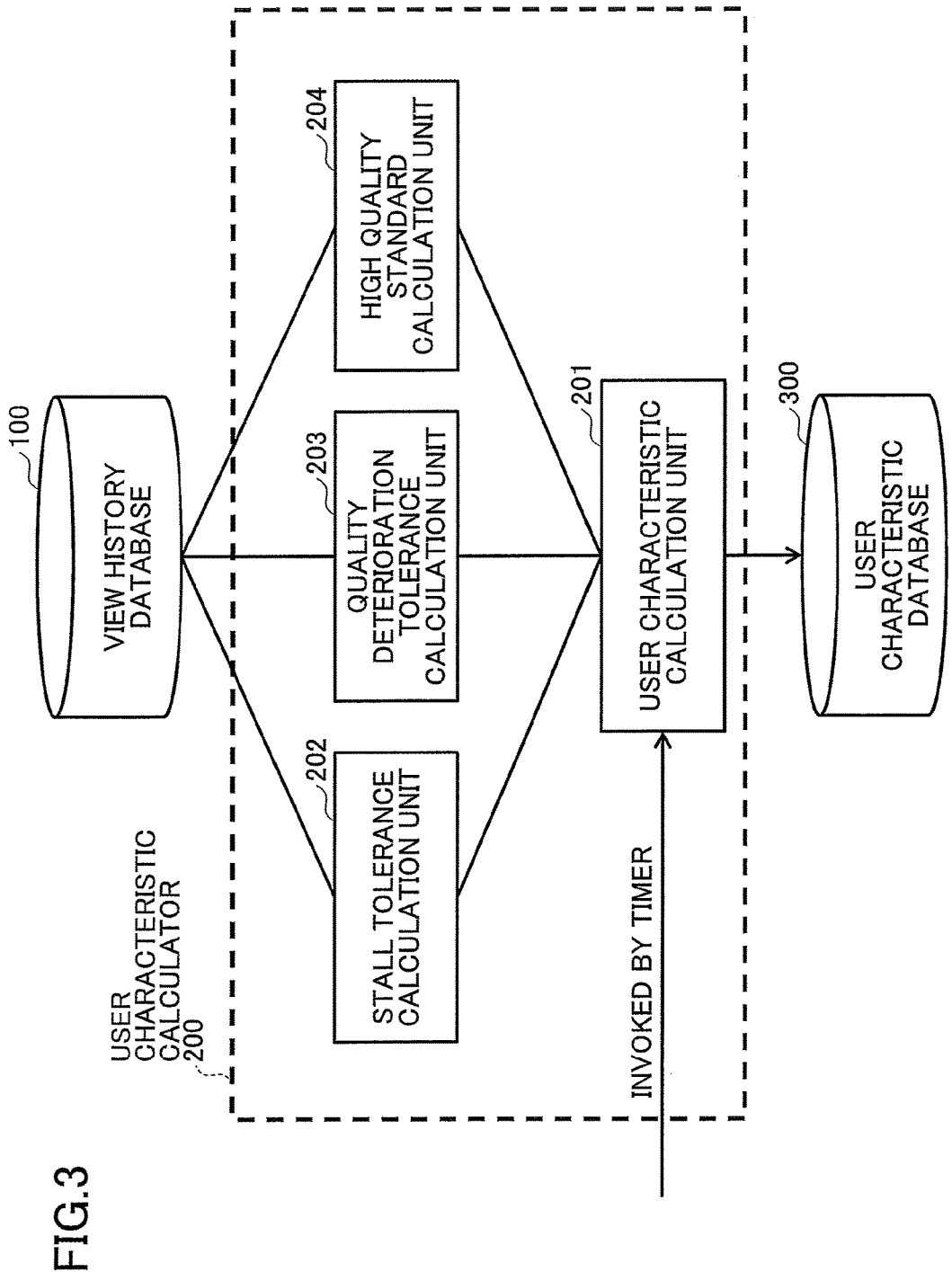
FIG. 3 illustrates a block diagram of a user characteristic calculator.

FIG. 3 illustrates a block diagram of the user characteristic calculator 200. As illustrated in FIG. 3, the user characteristic calculator 200 includes a user characteristic calculation unit 201, a stall tolerance calculation unit 202, a quality deterioration tolerance calculation unit 203, and a high quality standard calculation unit 204. As illustrated in FIG. 3, each of the stall tolerance calculation unit 202, the quality deterioration tolerance calculation unit 203, and the high quality standard calculation unit 204 is coupled to the view history database 100 and the user characteristic calculation unit 201. Details of each unit will be described later.

<Configuration of Delivery Rate Calculator 400>

Figure 4:
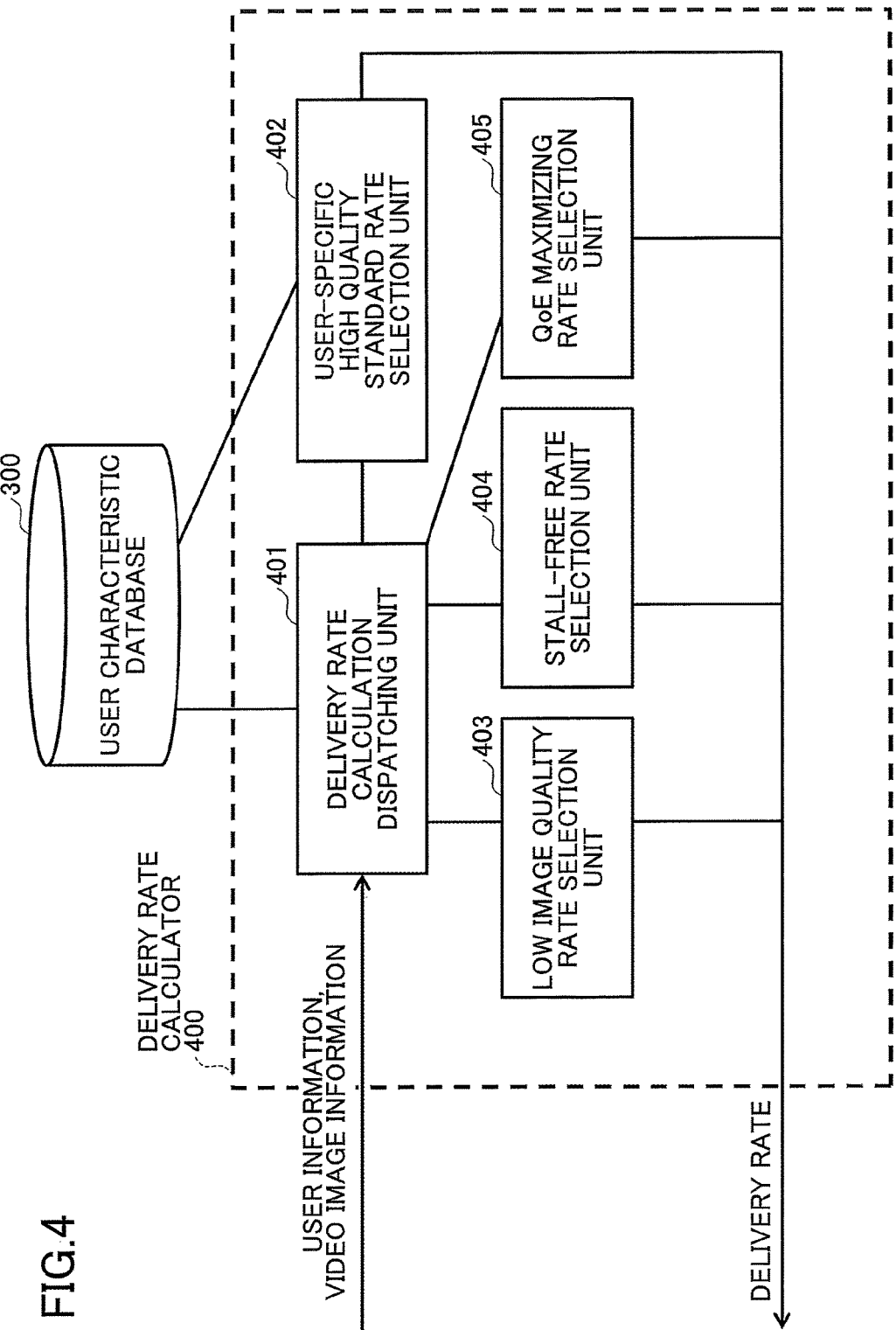
FIG. 4 illustrates a block diagram of a delivery rate calculator.

FIG. 4 illustrates a block diagram of the delivery rate calculator 400. As illustrated in FIG. 4, the delivery rate calculator 400 includes a delivery rate calculation dispatching unit 401, a user-specific high quality standard rate selection unit 402, a low image quality rate selection unit 403, a stall-free rate selection unit 404, and a QoE maximizing rate selection unit 405.

In the delivery rate calculator 400 illustrated in FIG. 4, when the delivery rate calculation dispatching unit 401 receives the inquiry of the delivery rate, the delivery rate calculation dispatching unit 401 causes one of the units 402 to 405 (the user-specific high quality standard rate selection unit 402, the low image quality rate selection unit 403, the stall-free rate selection unit 404, and the QoE maximizing rate selection unit 405) to perform the calculation. And, the encoding rate calculated by one of the units 402 to 405 which performed the calculation is returned to the inquiry source as the delivery rate. Details of each unit will be described later.

Next, detailed operations performed in the delivery rate calculation device according to the present embodiment will be described. The operations performed in the delivery rate calculation device include a calculation of the user characteristic performed by the user characteristic calculator 200 and a calculation of the delivery rate performed by the delivery rate calculator 400, each of which will be described in detail.

<Calculating User Characteristic>

Figure 7:
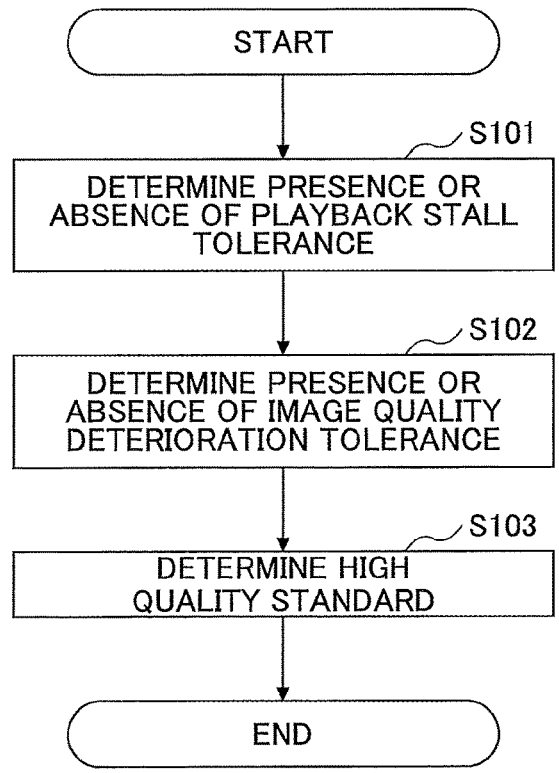
FIG. 7 is a flowchart illustrating a process of calculating user characteristic.

First, the calculation of the user characteristic will be described. The user characteristic calculator 200 performs the calculation of the user characteristic at a predetermined time by using a timer and the like, once a week for example. The calculation of the user characteristic is performed according to a process illustrated in a flowchart of FIG. 7. In the following, the calculation process of the user characteristic performed by the user characteristic calculator 200 (FIG. 2) will be described in accordance with the process illustrated in FIG. 7. Note that an order of steps S101 to S103 illustrated in FIG. 7 is just an example, and each of the steps may be executed in any order. Alternatively, each step may be executed in parallel.

When the user characteristic calculation unit 201 is started by the timer, the user characteristic calculation unit 201 instructs each of the units (units 202 to 204) to perform each calculation.

<Step S101: Calculating Presence or Absence of Playback Stall Tolerance>

At step S101, the stall tolerance calculation unit 202 performs calculation of the presence or absence of playback stall tolerance for each user. The stall tolerance calculation unit 202 first connects to the view history database 100 to obtain a view history of a user. As described above, each record of a view history includes, as an example, the user id, the viewing date and time, the video length, the viewed time length, the bit rate, and the stall count.

Next, based on the user's view history, the stall tolerance calculation unit 202 finds a group of the viewings such that the interval between the viewings is less than a threshold Th, and defines the group as a successive viewing. For example, when multiple view history records of the user are obtained, and if a first record and a second record, both of which belong to the obtained view history records, are in a relation such that the start time of viewing of the second record is less than the sum of the threshold Th and the end time of viewing of the first record, the viewing specified with the first record and the viewing specified with the second record can be regarded as successive. Therefore the stall tolerance calculation unit 202 defines or manages the two records as a successive viewing. Also, if there is another record regarded as successive with the first or second record, the record is also managed as a part of the successive viewing. Generally in the step, more than one "successive viewings" can be obtained (defined).

Next, the stall tolerance calculation unit 202 calculates the rate of occurrence of suspension (stop) of the successive viewings. To detect if a successive viewing is suspended, the stall tolerance calculation unit 202 checks if the viewing specified with the last record (the record having the latest viewing date and time) constituting the successive viewing is suspended or not. Whether the viewing of the last record is suspended or not can be detected by checking if the viewed time length is less than the video length. For example, in a case where two successive viewings are suspended among 10 successive viewings, the rate of occurrence of suspension is 0.2.

The rate described above is called stall acceptance. Next, the stall tolerance calculation unit 202 compares the calculated stall acceptance of the user with a predetermined threshold Ts. If the stall acceptance is less than Ts, the stall tolerance calculation unit 202 determines that the user has playback stall tolerance. And if the stall acceptance is not less than Ts, the stall tolerance calculation unit 202 determines that the user does not have playback stall tolerance. That is, a user who is likely to suspend successive viewing as he/she is unwilling to tolerate a playback stall, at the occurrence of a playback stall, is a user not having playback stall tolerance.

Since the process described above is performed for each user, the presence or absence of the playback stall tolerance is obtained for each user. The presence or absence of the playback stall tolerance obtained for each user is passed to the user characteristic calculation unit 201, and is stored into the user characteristic database 300 by the user characteristic calculation unit 201.

The threshold Ts is not limited to a specific value. For example, 0 can be used as the threshold Ts. Further, the threshold Ts may be determined such that the proportion of the number of users having the playback stall tolerance to the number of users not having the playback stall tolerance becomes constant (a predetermined value).

<Step S102: Calculating Presence or Absence of Image Quality Deterioration Tolerance>

At step S102, the quality deterioration tolerance calculation unit 203 performs calculation of the presence or absence of the image quality deterioration tolerance for each user. First, the quality deterioration tolerance calculation unit 203 connects to the view history database 100 to obtain a view history of a user.

Next, based on the user's view history, the quality deterioration tolerance calculation unit 203 determines a bit rate distribution of the user's past viewings (a distribution of the number of viewings of video images for each bit rate). To mitigate the effect caused by extremely long video images or extremely short video images, the video images that belong to the top 1% or the bottom 1% of video length distribution are excluded in determining the bit rate distribution. Note the "1%" in the description mentioned above is just an example, and another value may be used. In determining the bit rate distribution, the quality deterioration tolerance calculation unit 203 may consider one record in the user's view history as one viewing. And, by counting the number of records (which is considered to be the same as the number of viewings) for each bit rate, the bit rate distribution can be determined.

Next, the quality deterioration tolerance calculation unit 203 calculates, by using a predetermined threshold a and b, a difference between an average view completion rate of the top a % of viewings in the bit rate distribution and an average view completion rate of the bottom b % of viewings in the bit rate distribution, to calculate image deterioration acceptance.

Figure 8:
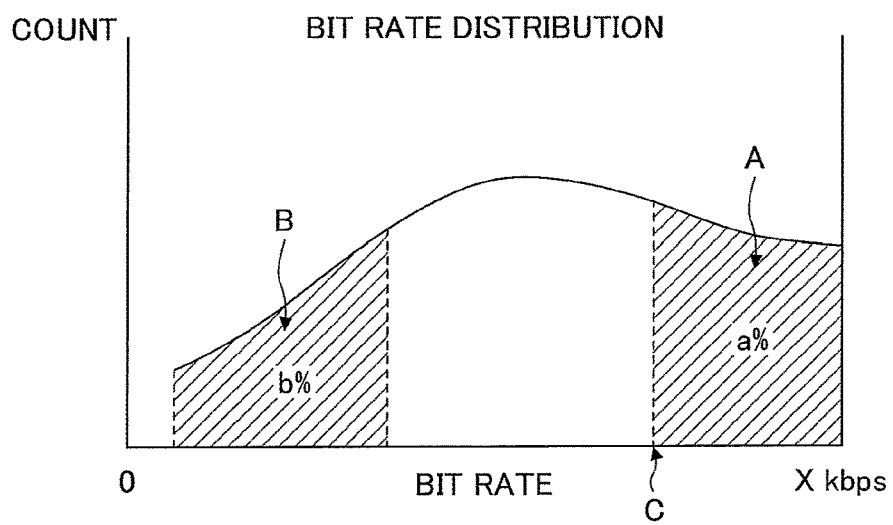
FIG. 8 is a drawing for explaining a calculation method of image deterioration acceptance.

Here, when for example one hundred viewings are viewed by the user (when 100 records exists) and if a is 30, the top a % of viewings in the bit rate distribution means 30 records (viewings) selected from the 100 records (viewings) in the descending order of the bit rate. Also, when for example one hundred viewings are viewed by the user (when 100 records exists) and if b is 30, the bottom b % of viewings in the bit rate distribution means 30 records (viewings) selected from the 100 records (viewings) in the ascending order of the bit rate. What is meant by the top a % of viewings and the bottom b % of viewings is conceptually illustrated in FIG. 8. In FIG. 8, a portion indicated by the reference sign A corresponds to the top a % of viewings in the bit rate distribution, and a portion indicated by the reference sign B corresponds to the bottom b % of viewings in the bit rate distribution.

Further, the view completion rate indicates how long a user viewed a video image specified with a record in the view history, which can be derived by dividing a time length of the user viewing the video image by a time length of the video image. For example, in a case where the video length of a record is 60 seconds and if a user viewed a video image specified with the record for 45 seconds (if the viewed time length of the record is 45 seconds), the view completion rate is 0.75. If the viewed time length is longer than the video length, the view completion rate should be 1.0. Further, if total length of playback stall is stored in the view history database 100, the view completion rate may be calculated by dividing a value obtained by subtracting the total length of playback stall from the viewed time length by the video length. The average view completion rate is an average of the view completion rates of multiple viewings.

Lastly, the quality deterioration tolerance calculation unit 203 compares the image deterioration acceptance with a predetermined threshold Tim, and determines that a user whose image deterioration acceptance is not higher than the threshold Tim has image quality deterioration tolerance and that a user whose image deterioration acceptance is higher than the threshold Tim does not have image quality deterioration tolerance. For example, if the average view completion rate of high bit rate video images is higher than the average view completion rate of low bit rate video images, it means that the user prefers a video image having a high bit rate and that the image quality deterioration tolerance of the user is low (the user does not have image quality deterioration tolerance).

Since the process described above is performed for each user, the presence or absence of the image quality deterioration tolerance is obtained for each user. The presence or absence of the image quality deterioration tolerance obtained for each user is passed to the user characteristic calculation unit 201, and is stored into the user characteristic database 300 by the user characteristic calculation unit 201.

The threshold Tim is not limited to a specific value. For example, 0 can be used as the threshold Tim. Further, the threshold Tim may be determined such that the proportion of the number of users having the image quality deterioration tolerance to the number of users not having the image quality deterioration tolerance becomes constant (a predetermined value).

<Step S103: Calculating High Quality Standard>

At step S103, the high quality standard calculation unit 204 performs calculation of a high quality standard for each user. The high quality standard is a minimum encoding rate of a video image which makes a user feel high quality.

The high quality standard calculation unit 204 first connects to the view history database 100 to obtain a view history of a user.

Next, the high quality standard calculation unit 204 extracts only the viewings of which the viewed time length is not less than a threshold, to eliminate the effect of zapping (the action of a user who stops viewing immediately after starting viewing). For example, if the threshold is 10 seconds, the high quality standard calculation unit 204 extracts only the records whose viewed time length is not less than 10 seconds from the records obtained as the view history of the user.

Subsequently, the high quality standard calculation unit 204 obtains a bit rate distribution based on the extracted records of the user, and determines a point corresponding to the top d % of viewings in the bit rate distribution as the high quality standard (d is a predetermined threshold). For example, in FIG. 8, if a portion indicated by the reference sign A corresponds to the top d % of viewings in the bit rate distribution, the point indicated by the reference sign C is the encoding rate corresponding to the high quality standard.

Since the process described above is performed for each user, the high quality standard is obtained for each user. The calculated high quality standard for each user is passed to the user characteristic calculation unit 201, and is stored into the user characteristic database 300 by the user characteristic calculation unit 201.

In the present embodiment, though "present" or "absent" is used for expressing the state of both the playback stall tolerance and the image quality deterioration tolerance, this expression is used just for convenience of explanation. That is, "absent" does not necessarily mean that a user has no playback stall tolerance or no image quality deterioration tolerance. Accordingly, the expression such as "high" or "low" may be used for expressing the state of the playback stall tolerance or the image quality deterioration tolerance, instead of "present" or "absent".

<Calculating Delivery Rate>

Next, the calculation of the delivery rate will be described. The delivery rate calculator 400 (illustrated in FIG. 4) performs calculation of the delivery rate every time an inquiry of a delivery rate is received. Though a source of the inquiry is not limited specifically, the video delivery server, the user terminal, and the like, are examples of the source of the inquiry. In the following, the calculation process of the delivery rate will be described in accordance with a flowchart illustrated in FIG. 9.

<Step S201: Receiving Inquiry of Delivery Rate>

In the delivery rate calculator 400, the delivery rate calculation dispatching unit 401 receives the inquiry of the delivery rate. In the present embodiment, the inquiry of the delivery rate includes user information (user id) and video image information (time length of the video image and a list of selectable encoding rates).

<Step S202: Obtaining Corresponding User Information>

At step S202, the delivery rate calculation dispatching unit 401 obtains the information (the presence or absence of the playback stall tolerance, the presence or absence of the image quality deterioration tolerance, and the high quality standard) corresponding to the user id received at step S201.

<Step S203: Dispatching Calculation>

At step S203, the delivery rate calculation dispatching unit 401 dispatches a calculation task. Before explaining the dispatching process, a method of selecting delivery rate performed in the present embodiment is described.

In the present embodiment, selection of the encoding rate is performed using a different policy for each of the combinations of the presence or absence of the playback stall tolerance and the presence or absence of the image quality deterioration tolerance.

More specifically, for a user having both the playback stall tolerance and the image quality deterioration tolerance, a policy to select the lowest encoding rate is used so as to lower network workload. For a user having the playback stall tolerance but not having the image quality deterioration tolerance, a policy to select the lowest encoding rate of the encoding rates equal to or higher than the high quality standard is used. For a user not having the playback stall tolerance but having the image quality deterioration tolerance, a policy to select the highest encoding rate of the encoding rates in which playback stall does not occur is used. For a user having neither the playback stall tolerance nor the image quality deterioration tolerance, to balance between video image quality and playback stall, a policy to select the encoding rate which maximizes QoE is used, which has been proposed in the conventional technique.

In the delivery rate calculator 400, at step S203, to make the above described process execute in the corresponding selection unit, the delivery rate calculation dispatching unit 401 causes one of the selection units, each of which corresponds to a different policy, to perform calculation, in accordance with the combination of the presence or absence of the playback stall tolerance and the presence or absence of the image quality deterioration tolerance. Specifically, the delivery rate calculation dispatching unit 401 performs the following process.

In the following, the presence and absence of the playback stall tolerance are expressed using the letters T and F. Also, the presence and absence of image quality deterioration tolerance are expressed using the letters T and F. Further, for example, a characteristic of a user having the playback stall tolerance and not having the image quality deterioration tolerance is written as (T, F).

When the characteristic (the presence or absence of the playback stall tolerance, and the presence or absence of the image quality deterioration tolerance) of the corresponding user (the user corresponding to the user id received at S201) is (T, T), the delivery rate calculation dispatching unit 401 delegates the process to the low image quality rate selection unit 403, and when the characteristic of the corresponding user is (T, F), the delivery rate calculation dispatching unit 401 delegates the process to the user-specific high quality standard rate selection unit 402. Further, when the characteristic of the corresponding user is (F, T), the delivery rate calculation dispatching unit 401 delegates the process to the stall-free rate selection unit 404, and when the characteristic of the corresponding user is (F, F), the delivery rate calculation dispatching unit 401 delegates the process to the QoE maximizing rate selection unit 405.

When delegating the process to each selection unit, the user information and the video image information received as the inquiry of the delivery rate, and the user characteristic and the like is passed to the selection unit to be delegated.

<Step S204: Selecting Encoding Rate, Returning Delivery Rate>

An encoding rate is selected at one of the selection units, and the selected encoding rate is returned (sent via the network) to the inquiry source as the delivery rate. Concrete processing is as follows.

The low image quality rate selection unit 403, which is a subject of the process when the characteristic (the presence or absence of the playback stall tolerance, and the presence or absence of the image quality deterioration tolerance) of the corresponding user is (T, T), selects the lowest encoding rate in the video image information, and returns the selected encoding rate to the inquiry source.

The user-specific high quality standard rate selection unit 402, which is a subject of the process when the characteristic of the corresponding user is (T, F), obtains the high quality standard of the corresponding user from the user characteristic database 300, selects the lowest encoding rate among the encoding rates which are contained in the video image information and which are not less than the high quality standard, and returns the selected encoding rate to the inquiry source.

The stall-free rate selection unit 404, which is a subject of the process when the characteristic of the corresponding user is (F, T), selects the highest encoding rate among the encoding rates which are contained in the video image information and for which a playback stall is estimated not to occur.

Specifically, for each encoding rate contained in the video image information of the inquiry, the stall-free rate selection unit 404 estimates the number of playback stalls that would occur when it is assumed that the video image is delivered at the encoding rate, by using the conventional technique disclosed in the Non-Patent Document 2 for example. Note that the process described here is based on the premise that the information necessary for the estimation is stored, for example, in the view history database 100. The stall-free rate selection unit 404 estimates the number of playback stalls by obtaining the information necessary for the estimation from the view history database 100.

After the estimation, the stall-free rate selection unit 404 extracts, among the encoding rates contained in the video image information, only the encoding rate whose estimated number of playback stalls is zero, selects the highest encoding rate among the extracted encoding rates, and returns the selected encoding rate to the inquiry source. When no encoding rate is found whose estimated number of playback stalls is zero, the stall-free rate selection unit 404 can extract the encoding rate whose estimated number of playback stalls is minimized.

The QoE maximizing rate selection unit 405, which is a subject of the process when the characteristic of the corresponding user is (F, F), selects the encoding rate which maximizes QoE among the encoding rates contained in the video image information by using conventional techniques, and returns the selected encoding rate to the inquiry source. Note that the process described here is also based on the premise that the information necessary for estimating the encoding rate which maximizes QoE is stored, for example, in the view history database 100. The QoE maximizing rate selection unit 405 estimates the encoding rate which maximizes QoE by obtaining the information necessary for the estimation from the view history database 100.

Summary of Embodiment

As described above, in the present embodiment, there is a provision for a delivery rate selection device, for selecting a delivery rate when delivering a video image from a video delivery server to a client in a video delivery service including a user characteristic storage unit configured to store user characteristics including a presence or absence of a playback stall tolerance for each user and a presence or absence of an image quality deterioration tolerance for each user, and a delivery rate calculating unit. When the delivery rate calculating unit receives from an inquiry source an inquiry of the delivery rate for delivering the video image to a given user, the delivery rate calculating unit acquires the presence or absence of a playback stall tolerance and the presence or absence of an image quality deterioration tolerance of the given user from the user characteristic storage unit, selects an encoding rate from a plurality of encoding rates of the video image according to a combination of the presence or absence of a playback stall tolerance and the presence or absence of an image quality deterioration tolerance of the given user, and returns the selected encoding rate as the delivery rate to the inquiry source.

The delivery rate selection device may include a view history storage unit configured to store view histories for each user, and a stall tolerance calculation unit configured to determine the presence or absence of a playback stall tolerance of the given user based on the view histories obtained from the view history storage unit by calculating a ratio of a number of successive viewings suspended by the given user to a number of successive viewings of the given user and by comparing the ratio with a predetermined threshold.

The delivery rate selection device may include a view history storage unit configured to store view histories for each user, and a quality deterioration tolerance calculation unit configured to determine the presence or absence of an image quality deterioration tolerance of the given user based on the view histories obtained from the view history storage unit, by calculating a difference between an average view completion rate of viewings at a high encoding rate and an average view completion rate of viewings at a low encoding rate, and by comparing the difference with a predetermined threshold.

The delivery rate calculating unit may, for example, select a minimum encoding rate among the plurality of encoding rates of the video image when the given user has the playback stall tolerance and the image quality deterioration tolerance.

When the given user has the playback stall tolerance and does not have the image quality deterioration tolerance, the delivery rate calculating unit may select a minimum encoding rate among the plurality of encoding rates of the video image not less than a predetermined encoding rate, the predetermined encoding rate being the encoding rate of the video image which makes the given user feel high quality.

When the given user does not have the playback stall tolerance and has the image quality deterioration tolerance, the delivery rate calculating unit may select a maximum encoding rate among the plurality of encoding rates of the video image for which a playback stall is estimated not to occur.

According to the embodiment of the present invention, the technique can be provided that enables the selection of an encoding rate in the video delivery service in accordance with the characteristics of each user. By the technique, a control is enabled considering the characteristics of each individual to what kind of quality he/she gives weight, so that the differentiation with other services provided by competitor, and the increase of usage time or usage frequency of the video delivery service where the present technique is applied, can be expected.

The present invention is not limited to the embodiment described above, but can be modified to be used in various ways within the scope of this invention.

This application is based upon and claims the benefit of priority of the prior Japanese Patent Application No. 2015-148829, filed on Jul. 28, 2015, the entire contents of which are incorporated herein by reference.

LIST OF REFERENCE SYMBOLS 100 view history database
150 media drive
152 auxiliary storage device
153 memory device
154 CPU
155 interface device
156 display device
157 input device
200 user characteristic calculator
201 user characteristic calculation unit
202 stall tolerance calculation unit
203 quality deterioration tolerance calculation unit
204 high quality standard calculation unit
300 user characteristic database
400 delivery rate calculator
401 delivery rate calculation dispatching unit
402 user-specific high quality standard rate selection unit
403 low image quality rate selection unit
404 stall-free rate selection unit
405 QoE maximizing rate selection unit

What is claimed is:

1. A delivery rate selection device for selecting a delivery rate when delivering a video image from a video delivery server to a client in a video delivery service, the delivery rate selection device comprising a memory storing a program, a storage device, and a processor configured to execute the program to implement a process including:
   storing, in the storage device, user characteristics including a presence or absence of a playback stall tolerance for each user and a presence or absence of an image quality deterioration tolerance for each user;
   acquiring, in response to receiving from an inquiry source an inquiry of delivery rate for delivering the video image to a given user, the presence or absence of a playback stall tolerance and the presence or absence of an image quality deterioration tolerance of the given user from the storage device;
   selecting an encoding rate from a plurality of encoding rates of the video image according to a combination of the presence or absence of a playback stall tolerance and the presence or absence of an image quality deterioration tolerance of the given user; and
   returning the selected encoding rate as the delivery rate to the inquiry source.

2. The delivery rate selection device according to claim 1, the process further including:
   storing, in the storage device, view histories for each user; and
   determining the presence or absence of a playback stall tolerance of the given user based on the view histories obtained from the storage device, by calculating a ratio of a number of successive viewings suspended by the given user to a number of successive viewings of the given user, and by comparing the ratio with a predetermined threshold.

3. The delivery rate selection device according to claim 1, the process further including:
   storing, in the storage device, view histories for each user; and
   determining the presence or absence of an image quality deterioration tolerance of the given user based on the view histories obtained from the storage device, by calculating a difference between an average view completion rate of viewings at a high encoding rate and an average view completion rate of viewings at a low encoding rate, and by comparing the difference with a predetermined threshold.

4. The delivery rate selection device according to claim 1, wherein, in the selecting of the encoding rate, a minimum encoding rate is selected among the plurality of encoding rates of the video image, when the given user has the playback stall tolerance and the image quality deterioration tolerance.

5. The delivery rate selection device according to claim 1, wherein, in the selecting of the encoding rate, when the given user has the playback stall tolerance and does not have the image quality deterioration tolerance, a minimum encoding rate is selected among the plurality of encoding rates of the video image not less than a predetermined encoding rate, the predetermined encoding rate being the encoding rate of the video image which makes the given user feel high quality.

6. The delivery rate selection device according to claim 1, wherein, in the selecting of the encoding rate, a maximum encoding rate is selected among the plurality of encoding rates of the video image for which a playback stall is estimated not to occur, when the given user does not have the playback stall tolerance and has the image quality deterioration tolerance.

7. A method of selecting a delivery method performed by a delivery rate selection device for selecting a delivery rate when delivering a video image from a video delivery server to a client in a video delivery service, the delivery rate selection device comprising a user characteristic storage unit configured to store user characteristics including a presence or absence of a playback stall tolerance for each user and a presence or absence of an image quality deterioration tolerance for each user, the method comprising:
   receiving from an inquiry source an inquiry of delivery rate for delivering a video image to a given user;
   acquiring the presence or absence of a playback stall tolerance and the presence or absence of an image quality deterioration tolerance of the given user from the user characteristic storage unit;
   selecting an encoding rate from a plurality of encoding rates of the video image according to a combination of the presence or absence of a playback stall tolerance and the presence or absence of an image quality deterioration tolerance of the given user; and
   returning the selected encoding rate as the delivery rate to the inquiry source.

8. A non-transitory computer-readable recording mediums storing a program to cause a computer to function as at least one of the units in the delivery rate selection device according to claim 1.

* * * * *